Figure 1:
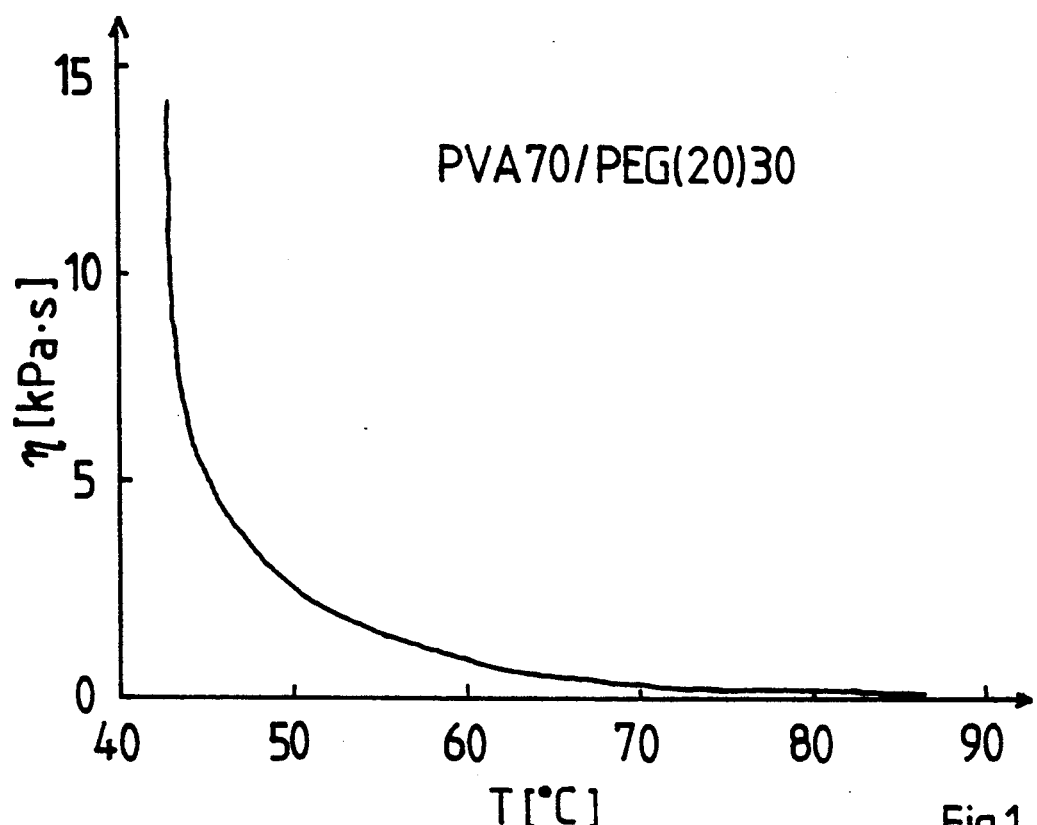

United States Patent [19]

Menke et al.

[11] Patent Number: 5,098,942

[45] Date of Patent: Mar. 24, 1992

[54] BINDER FOR METAL OR CERAMIC POWDER

[75] Inventors: Klaus Menke, Bruchsal; Lothar Merz, Karlsruhe; Mathias Helfrich, Landau, all of Fed. Rep. of Germany

[73] Assignee: Fraunhofer-Gesellschaft zur Forderung der andewandten Forschung e.v., Munich, Fed. Rep. of Germany

[21] Appl. No.: 616,841

[22] Filed: Nov. 21, 1990

[30] Foreign Application Priority Data

Nov. 24, 1989 [DE] Fed. Rep. of Germany ....... 3938894

[51] Int. Cl.$^5$ .......................... C08J 3/18; C08K 5/11; C08L 31/04
[52] U.S. Cl. ..................... 524/314; 524/377
[58] Field of Search ..................... 524/314, 377

[56] References Cited

U.S. PATENT DOCUMENTS 4,289,672 9/1981 Friederich et al. ................. 524/537

Primary Examiner—Paul R. Michl
Assistant Examiner—U. K. Rajguru
Attorney, Agent, or Firm—Antonelli, Terry, Stout & Kraus

[57] ABSTRACT

A binder composition for injection moulding or extrusion of metallic or ceramic powders in sintering technology comprised 30 to 90% by weight PVA with an average molecular weight of 35,000 to 1,000,000 and 10 to 70% by weight PEG with an average molecular weight of 500 to 50,000 as the melt softener and processing plasticizer. The PEG can be wholly or partly replaced by prepolymeric, aliphatic polyesters of adipic acid and PEG with an average molecular weight of 2,000 to 20,000 or by hydroxy-terminated copolymers of ethylene and propylene oxide with the same average molecular weight.

9 Claims, 2 Drawing Sheets

BINDER FOR METAL OR CERAMIC POWDER

The invention relates to a binder composition for injection moulding or extrusion of metal or ceramic powders.

Powder injection moulding or extrusion is known for the purpose of producing metallic or ceramic components having a complex geometry and in relatively large numbers. In many cases this moulding method is the only one which is economically possible and sometimes it is in fact the sole alternative. In said method the metal or ceramic powder is dispersed in a polymeric thermoplastic binder system and processed to a compound. The aim is to obtain maximum filler proportions (powder proportions). After shaping the compound in the injection moulding or extrusion process a plastic-bound green compact is initially obtained. By controlled heating the binder is removed from it and the remaining porous metal part is sintered at high temperatures up to its final strength. Ceramic green compacts are additionally compressed under high pressure (HIP process).

In said process the binder must fulfil a number of requirements. Thus, it must be possible for thermoplastic processing to take place in the extrusion or injection moulding process at temperatures of up to approximately 80° to 200° C. The compound must have an adequate flowability, i.e. an adequately long flow path length, even when it has a high filler proportion. At ambient temperature the compound must solidify to a solid matrix with adequate stability and rigidity (good green strength of the injection moulded or extruded part). During processing, which takes place under a high shearing load, there must be no demixing of powder and binder. At ambient temperature the binder composition must not have any adhesive action, so that the component can be extruded or removed from the mould without difficulty. At temperatures above the processing temperature it must be possible to decompose or burn without residue the binder composition. No shape change must occur to the green compact on expelling the binder (pyrolysis). There must also be no destruction or burning of the green compact. These conditions must still be fulfilled if the expulsion or pyrolysis takes place over a short period of time.

Finally, the binder must be economically viable and inexpensive.

Known binder systems are built up on the basis of polyethylene, polypropylene and waxes. They mainly comprise nonpolar, difficulty wetted hydrocarbon polymers, which in part only decompose at high temperatures and where only slow expulsion is possible. If waxes are used, they frequently have phenolic components and in some cases also aromatic components, which graphitize during pyrolysis under an inert gas or vacuum and consequently leave behind residues on the finished article.

A binder composition in particular allowing residue-free, rapid expulsion is built up on the basis of methyl cellulose, water, glycerol and boric acid (Rivers process). However, problems occur with this process regarding setting a good flowing consistency of the binder for an adequate green strength of the moulded or extruded article. In addition, long residence and hardening times in the mould are required which make the process uneconomic, so that it has not been used on a mass production basis. The aforementioned prior art is described in the enclosed literature list.

According to the invention such a binder composition comprises 30 to 90% by weight of polyvinyl acetate (PVA) with an average molecular weight of 35,000 to 1,000,000 and 10 to 70% by weight of a melt softener and processing plasticizer for PVA chosen from a) Polyethylene glycol (PEG) with an average molecular weight of 500 to 50,000, b) prepolymeric, aliphatic polyesters of adipic acid and PEG with an average molecular weight of 2,000 to 20,000 and c) hydroxy-terminated copolymers of ethylene and propylene oxide with an average molecular weight of 2,000 to 20,000, in which component a) with b) or c) can also be present in the form of a mixture with 5 to 30% by weight of b) or c) in the total quantity of the binder composition.

Polyvinyl acetate as the polar thermoplastic polymer and polyethylene glycol as the plasticizer can be easily pyrolysed and expelled in residue-free form. Both components have a comparatively high oxygen index and can therefore be decomposed by thermal pyrolysis above approximately 200° C. in residue-free manner into low molecular weight components. Although PVA and PEG are immiscible at ambient temperature and in the solid state, but as from approximately 70° C. the melting PEG starts to mix with the PVA to give a homogeneous, readily flowing solution. Therefore the PEG acts as a melt softener and as a plasticizer for the PVA. It leads to a clear reduction in the melt viscosity and allows a not inconsiderable increase in the powder proportion within the compound. The PEG also leads to a very good wetting and dispersing of the metal or ceramic powder particles. The compounds produced with the inventive binder composition can still contain up to 70% filler in the case of very fine-grained, difficulty wettable hard metal, e.g. tungsten carbide with cobalt in an average particle size of 1 to 2 $\mu$m. Despite this high filler concentration, they flow readily and can be easily processed by extrusion or injection moulding with considerable flow path lengths and at temperatures of 90° to 120° C. As a result of this low processing temperature no or little heating of the injection mould or extrusion die is required. Even with the injection mould at ambient temperature adequate flow lengths can still be obtained at high injection rates. The wetting action of the PEG leads to no separation between the solids and liquid binder component. Similar advantages and effects can be obtained with the alternative melt softeners and plasticizers, namely prepolymeric, aliphatic polyesters of adipic acid and PEG or hydroxy-terminated copolymers of ethylene and propylene oxide for an average molecular weight of 2,000 to 20,000. The objective is also achieved by mixtures of PEG and the alternative melt softeners, the PEG proportion in the total binder composition being 5 to 30% by weight.

In connection with slurry, it is admittedly known (JP-A-62-92804) to use polyvinyl butyral with PEG as the softener or PVA with phthalate as the softener and to mix same with a solvent. However, working takes place in the liquid phase and the powder is dispersed therein, so that a pourable slurry is obtained.

Preferably the PVA is used with a molecular weight of 50,000 to 200,000 and the PEG with an average molecular weight of 6,000 to 35,000. In addition, a composition of 60 to 80% by weight PVA and 20 to 40% by weight PEG has proved to be advantageous.

It has also proved advantageous to add as wetting agents and dispersing aids for the metal or ceramic powder residue-free pyrolyzable aliphatic surfactants, e.g. polyethylene oxide adducts to fatty acids, alcohols and amides, sugar and cellulose esters of organic fatty acids or ethers of fatty alcohols or lecithin in a proportion of 0.5 to 5% by weight.

The addition of adhesives is advantageous for binding the powder particles in the binder matrix. In particular, it is possible to use aliphatic amino alcohols, amino ethers, amino ether alcohols or hydantoins in a proportion of 0.5 to 5% by weight.

Finally the processability and flowability of the compound can be improved by residue-free pyrolyzing lubricants. The latter can in particular be paraffins and/or short-chain ethylene polymers or aliphatic fatty acid esters with at least 8 C-atoms in a proportion of 0.5 to 8% by weight.

The inventive binder composition can be used with particular advantage in the processing of tungsten carbide/cobalt, tantalum or niobium carbide hard metal materials, as well as heavy metal materials based on iron/nickel, tungsten/nickel/iron and nickel superalloys. It is also possible to process corrosion-resistant high-grade steel powders with the inventive binder composition for filler contents up to 70 volume %. The same applies regarding ceramic materials, such as silicon carbide and nitride, titanium or zirconium nitrides, carbides or borides, zirconium oxide, aluminium oxide powders, etc.

The inventive binder composition also allows economic production. This is due to the comparatively low costs of the starting materials and the low process costs, so that inexpensive injection moulding or extrusion of the powder metal materials or powder ceramic materials is possible. As expulsion is possible in residue-free manner in a short time and at relatively low temperatures, excellent material and sintering qualities are obtained on the finished article.

Figure 2:
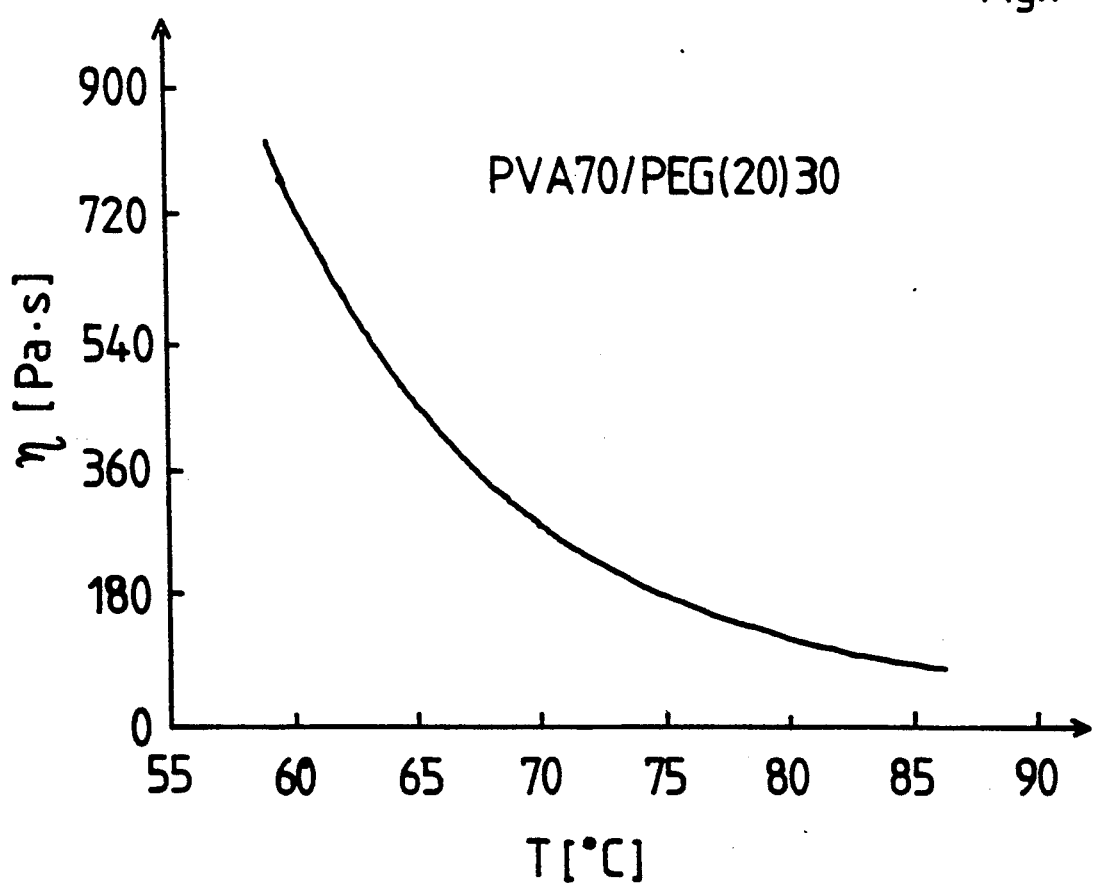

FIG. 1 shows in graph form for the binder according to the aforementioned example the path of the viscosity in kPa s over the temperature and in FIG. 2 the viscosity is given in Pa s for the vital temperature range. This makes clear the good flowability of the binder at temperatures above 70° C. where there is a homogeneous, readily flowing mixing of the PVA and PEG. The viscosity path is also decisive for the good flow-ability of the compound.

Figure 3:
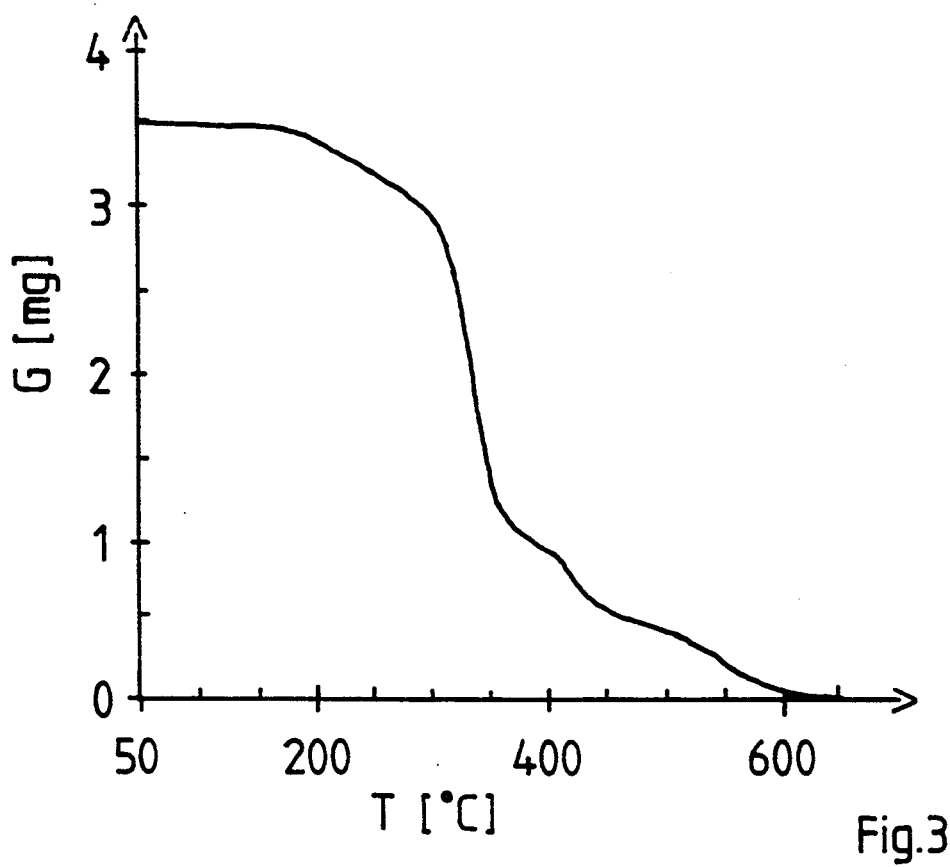

In the form of a graph FIG. 3 shows the thermogravimetry of the binder composition. The absolute weight decrease in mg as a function of the temperature is given.

Figure 4:
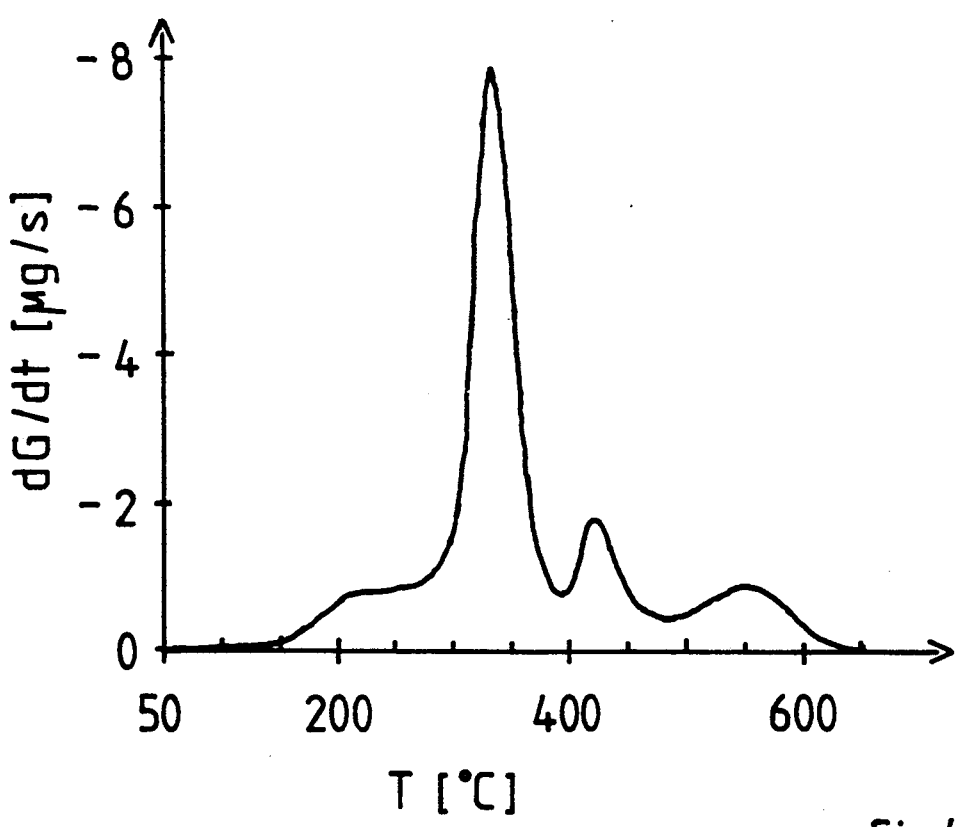

The graph according to FIG. 4 shows the time weight decrease in $\mu/s$ and illustrates the process of expelling the binder in the aforementioned example.

EXAMPLE 1

In the case of a hard metal powder of 94% by weight tungsten carbide and 6% by weight cobalt with an average particle size of 1 to 2 $\mu m$, use is made of a plastic binder comprising 70% by weight polyvinyl acetate (Mowilith 20 of Hoechst AG) and 30% by weight polyethylene glycol with a molecular weight of 20,000.

65 vol. % of hard metal powder with 35 vol. % of plastic binder, accompanied by the addition of 1.5% by weight polyethoxysorbitan trioleate as the wetting and dispersing aid are dry premixed at ambient temperature in a horizontal kneader. The powder/binder mixture is subsequently melted in an extruder at 120° C. and homogenized and granulated after extrusion to form a compound. This granulate can be stored and further processed by injection moulding or extrusion. The binder content of 35 vol. % corresponds to approximately 5% by weight in the compound.

After producing a green compact by injection moulding or extrusion the binder is expelled under inert gas, e.g. argon, at temperatures of approximately 200° C. This temperature is maintained for approximately one hour. The temperature is then raised to 270° C. and maintained for approximately 2 hours. It is then raised to 320° C. and maintained for approximately 2 further hours. Finally, the temperature is slowly raised to approximately 550° C. Immediately following this heating directly to the sintering temperature can take place, accompanied by the metering in of hydrogen. The duration of the sintering process is dependent on the attainable temperature and the size of the workpiece. The lower limit can be 1200° C. but, if possible, the sintering temperature should be above 1400° C.

EXAMPLE 2

65% by volume or 86% by weight of aluminum oxid powder with an average particle size of 2,1 $\mu m$ are mixed in a horizontal kneader with 14% by weight of plastic binder. Subsequently the mixture is melted at 120° C. and homogenized. The plastic binder is a mixture of 50% by weight of polyvinyl acetate with an average molecular weight of 120.000 and 40% by weight of PEG with an average molecular weight of 20.000 and 9,5% by weight of a prepolymeric, aliphatic polyester of adipic acid and PEG with an average molecular weight of 3000 and 0,5% by weight of an surface-active tenside consisting of an ethoxylaurylacid ester (for improving the slipping properties in the extruder).

The aforementioned compound can be extruded to a feed stock granulate material with good free flow properties and can be processed by injection moulding at 120° C.

The formed pieces have a good green strength and the binder ist expelled in the same way as in Example 1.

EXAMPLE 3

25% by volume or 92,5% by weight of metal powder of iron/chrome/nickel-type with an average particle size of 7,5 $\mu m$ and 35% by volume or 7,5% by weight of plastic binder are mixed in a horizontal kneader; the mixture then is melted at 140° C. and homogenized. The plastic binder consists of 70% by weight of polyvinyl acetate with an average molecular weight of 240.000 and 24% by weight of a copolymer of 60% ethylenoxid and 40% polypropylene oxid with an average molecular weight of 20.000 and 0,5% by weight of a diamine substituted trimeric ethylene oxid used a adhesive agent and 0,5% by weight of ethoxydodecyl acid polyester used as a slipping agent.

The compound has a good flowability even in high shearing speed ranges within the extruder. The formed pieces have a good green strenght. The binder is expelled in the same way as in Example 1.

We claim:

1. Binder composition for the injection molding or extrusion of metal or ceramic powders, containing 30 to 90% by weight of polyvinyl acetate (PVA) with an average molecular weight of 35,000 to 1,000,000 and 10 to 70% by weight of a material which functions as a melt softener and processing plasticizer for PVA selected from the group consisting of
  a) polyethylene glycol (PEG) with an average molecular weight of 500 to 50,000,
  b) prepolymeric, aliphatic polyesters of adipic acid and PEG with an average molecular weight of 2,000 to 20,000,
  c) hydroxy-terminated copolymers of ehtylene and propylene oxide with an average molecular weight of 2,000 to 20,000,
  d) a mixture of PEG with an average molecular weight of 500 to 50,000 and 5 to 30% by weight of prepolymeric, aliphatic polyesters of adipic acid and PEG with and average molecular weight of 2000 to 20,000 in the total quantity of the binder composition; and
  e) a mixture of PEG with an average molecular weight of 500 to 50,000 and 5 to 30% by weight of hydroxy-terminated copolymers of ethylene and propylene oxide with an average molecular weight of 2,000 to 20,000.

2. Binder composition according to claim 1, wherein the PVA has a molecular weight of 50,000 to 200,000.

3. Binder composition according to claims 1 or 2, wherein the PEG has a molecular weight of 6,000 to 35,000.

4. Binder composition according to one of the claims 1 or 2 wherein 60 to 80% by weight PVA and 20 to 40% by weight PEG are contained.

5. Binder composition according to claim 1, further comprising a wetting agent and dispersing aid for the metallic or ceramic powder constituted by residue-free pyrolyzable aliphatic surfactants in a proportion of 0.5 to 5% by weight.

6. Binder composition according to one of the claims 1 or 5, further comprising an adhesive for the metallic or ceramic powder and the binder and being selected from the group consisting of aliphatic amino alcohols, amino ethers, amino ether alcohols and hydantoins, wherein said adhesive is provided in a proportion of 0.5 to 5% by weight.

7. Binder composition according to one of the claims 1 or 5, further comprising a lubricant for improving the flowability of the metallic or ceramic powder and the binder and being selected from the group consisting of paraffins, short-chain ethylene polymers and aliphatic fatty acid esters wit at least 8 C-atoms, wherein said lubricant is provided in a proportion of 0.5 to 8% by weight.

8. Binder composition according to claim 5, wherein said residue-free pyrolyzable aliphatic surfactants are selected from the group consisting of polyethylene oxide adducts to fatty acids, alcohols and amides, sugar and cellulose esters of organic fatty acids or ethers of fatty alcohols or lecithen.

9. Binder composition according to one of the claim 6, further comprising a lubricant for improving the flowability of the metallic or ceramic powder and the binder and being selected from the group consisting of paraffins, short-chain ethylene polymers and aliphatic fatty acid esters with at least 8 C-atoms, wherein said lubricant is provided in a proportion of 0.5 to 8% by weight.

* * * * *